Figure 1:
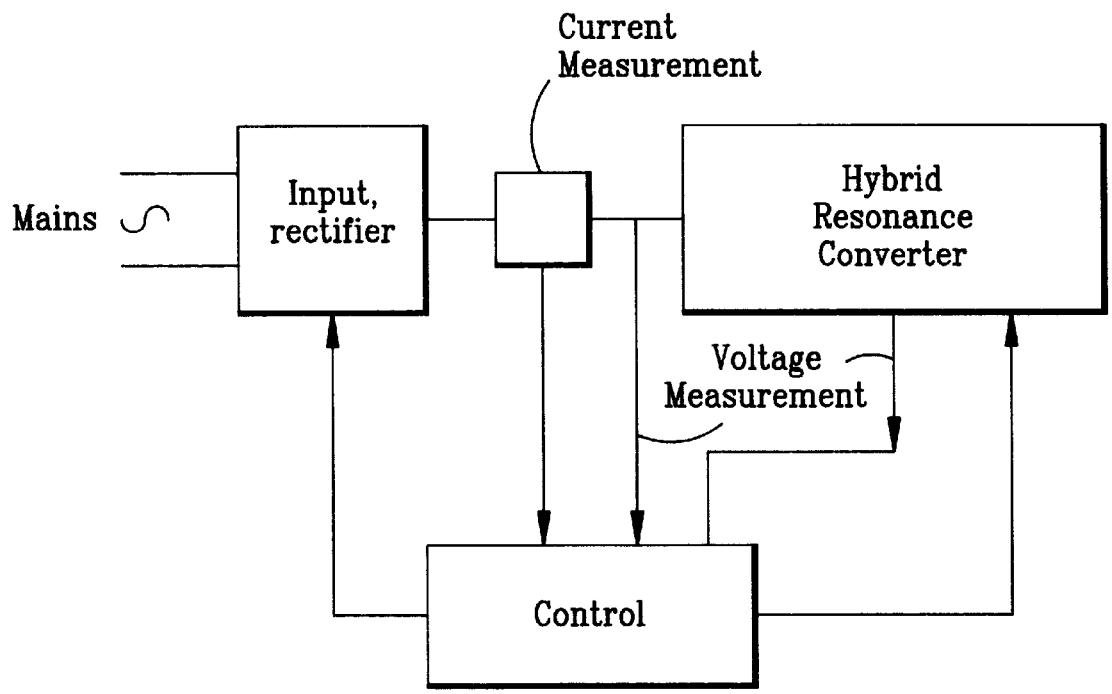

United States Patent

Dahl

[11] Patent Number: 5,914,066
[45] Date of Patent: Jun. 22, 1999

[54] CIRCUIT FOR THE CONTROL OF ENERGY SUPPLY IN A RESONANCE CONVERTER

[75] Inventor: Jan E. Dahl, Fredericia, Denmark

[73] Assignee: Aktiebolaget Electrolux, Stockholm, Sweden

[21] Appl. No.: 08/714,057

[22] PCT Filed: Mar. 9, 1995

[86] PCT No.: PCT/DK95/00113

§ 371 Date: Nov. 5, 1996

§ 102(e) Date: Nov. 5, 1996

[87] PCT Pub. No.: WO95/24817

PCT Pub. Date: Sep. 14, 1995

[30] Foreign Application Priority Data

Mar. 9, 1994 [DK] Denmark .................................. 0274/94

[51] Int. Cl.$^6$ ........................................... H05B 6/06
[52] U.S. Cl. ........................ 219/661; 219/625; 219/663; 363/98
[58] Field of Search .................................. 219/625, 626, 219/627, 661, 663, 665, 666, 715, 716, 620; 363/98, 97, 96, 135, 136, 37, 38

[56] References Cited

U.S. PATENT DOCUMENTS

| 3,737,757 | 6/1973 | Fowler et al. ......................... 363/135 |
| 4,426,564 | 1/1984 | Steigerwald et al. ................... 219/624 |
| 4,833,584 | 5/1989 | Divan ........................................ 363/37 |
| 5,486,752 | 1/1996 | Hua et al. ................................. 363/16 |
| 5,486,993 | 1/1996 | Sakurai et al. ........................... 363/98 |

FOREIGN PATENT DOCUMENTS

| 0 054 445 | 6/1982 | European Pat. Off. . |
| 0 054 445 B1 | 9/1985 | European Pat. Off. . |
| 37 31 555 C1 | 9/1987 | European Pat. Off. . |
| 0 561 206 A2 | 9/1993 | European Pat. Off. . |
| WO 90/04881 | 5/1990 | WIPO . |

Primary Examiner—Philip H. Leung
Attorney, Agent, or Firm—Sixbey, Friedman, Leedom & Ferguson; David S. Safran

[57] ABSTRACT

Circuits for high frequency energy supply for cooking pots, etc. utilize resonant circuits in which the coil for the energy transfer forms a part. Furthermore circuits of the inverter type are used. It has turned out to be advantageous to use an extra circuit which gives the current feed from the rectifier of the power supply unit to the inverter a period of oscillation which is less than or equal to the period of oscillation of the resonant circuit. In this manner an efficient control of the supplied power is obtained, and the losses are reduced. Furthermore measuring signals may be derived which may be used for increasing the safety with respect to incorrect use.

15 Claims, 3 Drawing Sheets

CIRCUIT FOR THE CONTROL OF ENERGY SUPPLY IN A RESONANCE CONVERTER

The invention relates to a circuit for the control of the energy supply in a resonance converter of the type which comprises a rectifier for the mains voltage, an inverter and a resonant circuit which delivers energy by inductive coupling to a cooking vessel for food, with a view to increasing the safety.

A resonance converter for use in connection with induction heating of foodstuffs must deliver a high frequency current, e.g. in the bottom of a cooking vessel It is essential that the efficiency is high which means that current losses in electronic switches must be low. It is furthermore important that the semiconductor components, such as switches, which form part of the construction are not subjected to even brief loads to their specified limits because this decreases their lifetime considerably. A resonance converter of the type described utililizes a resonant circuit where the self-inductance participates, both for determining resonant frequency of the resonant circuit and for inductive energy transfer. It is the intention that the only losses shall be the desired losses in the bottom of the cooking vessel. It has been found advantageous to use a so-called hybrid resonance converter which utilizes the advantages of a parallel resonant circuit which are that no resonant current passes through switches, while this is series coupled to a further self-inductance which together with the components of the parallel resonant circuit define a series resonant circuit, the advantage of which is that the current may be interrupted at a zero crossing of the series resonant current.

Many converters are based on the rectification of the mains voltage in a double rectifier (in single-phase and between phases in a three-phase mains), a charging capacitor in a DC circuit and a subsequent inverter. Most conventional inverters load the DC circuit by a rectangular current which gives high internal losses and which reacts back to the mains where it gives high peak currents, even though the effective value of the current only corresponds to the power taken up by the inverter to which losses in the circuits must be added.

Traditional parallel resonant circuits in an inverter present serious problems in connection with closing or breaking of the current to the resonant circuit due to the placement of the self-inductance. An inverter which is built as a full bridge or a half bridge must invert the current through the resonant circuit and this occurs by letting one set of switches break a current essentially simultaneously with another set having to close a current. A full bridge will have four switches which take turns conducting two and two, and in a halt bridge two of the switches have been replaced by capacitors. Due to the self-inductance a break which is too late will mean that a constant current flows for period of time which is in effect a short circuit, and too early breaking will create a strong over-voltage. Both phenomena are harmful to the semiconductor components which are used for the switches. Due to the series connected capacitor a series resonant circuit does not display these disadvantages, but the resonant current must always run through switches, and thus undesired losses are created.

It is the purpose of the invention to provide a circuit for the control of the feed of energy in a circuit of the type described in the preamble which reduces the losses, reduces the load on the switches and which permits a control of the power supply, e.g. to zero in the case of a missing load, such as a cooking vessel or another inductively heated heating element.

This is obtained in that the current fed to the parallel resonant circuit has a pulse width which is less than or equal to half the period of oscillation of the parallel resonant circuit. Hence the case is that current is fed once per half period of the parallel resonance current by means of a pulse, the temporal development of which being predetermined, whereby it does not become a rectangular current, and it is switched off efficiently without the generation of over-voltages. It is the objective that the current pulse obtains the shape of a half period of a sinusoidal oscillation, because this has been demonstrated to minimize losses. This pulse shaping may be obtained in many ways, including digitally utilizing a stored table of the curve shape.

An advantageous and simple way to obtain this basic function is that the series self-inductance of the hybrid resonant circuit has a value such that the oscillating period of the series resonant circuit becomes less than or equal to the oscillating period of the parallel resonant circuit.

In a particularly advantageous embodiment of the invention the current is fed with a starting instant which is up to 90 degrees before the zero crossing of the voltage of the hybrid resonant circuit.

In a further advantageous embodiment the current is switched off when it passes a value which is as close to zero as possible.

In an advantageous embodiment the current is fed with a starting instant which is up to maximum 105 degrees after the zero crossing of the voltage of the hybrid resonant circuit.

In a further advantageous embodiment of the invention the current which is fed to the hybrid resonant circuit is measured in order to detect the delivery of energy Hereby special circuits will enable the breaking of current supply in the case of no load, whereby the whole apparatus is secured against radiation in case of misuse.

In a particularly advantageous embodiment the mean value of the current is measured.

In a further advantageous embodiment the current through or the voltage across LR is measured as the input signal for the evaluation of the presence of an unsuitable material for the cooking vessel bottom.

In a further embodiment currents and voltages are measured in a test phase during supply of energy in a time interval which lies in the interval between the duration of a half-period of the resonance frequency of the resonant circuit and the duration of a half period of the mains voltage.

Figure 2:
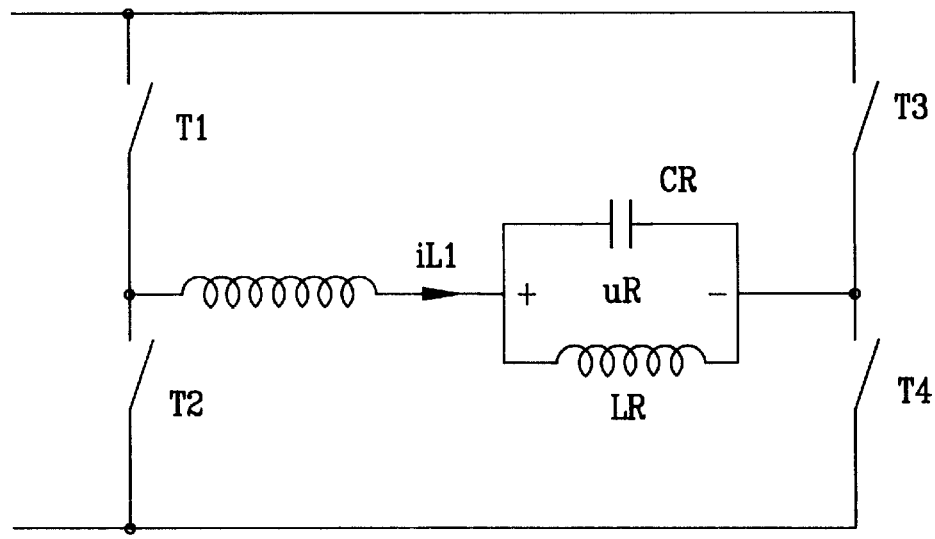
Figure 3:
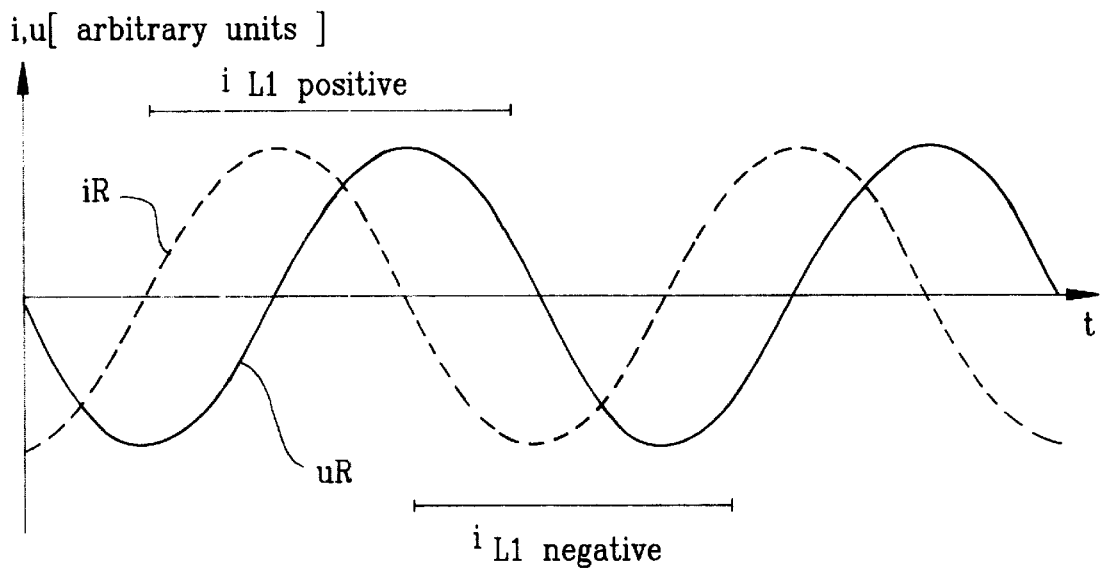
Figure 4:
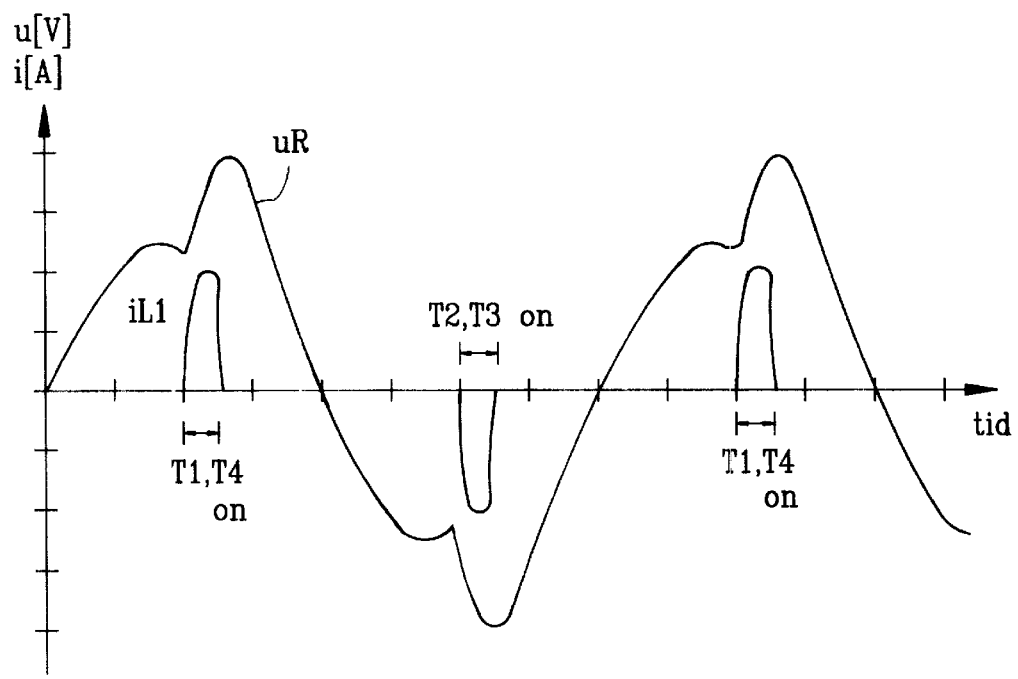
Figure 5:
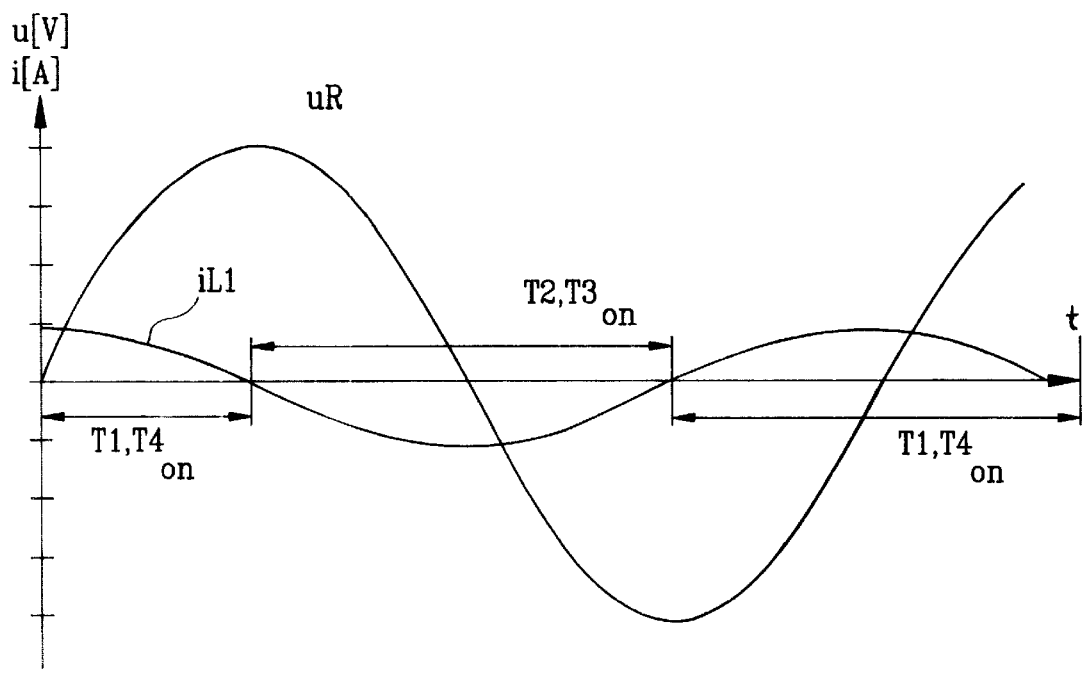
Figure 6:
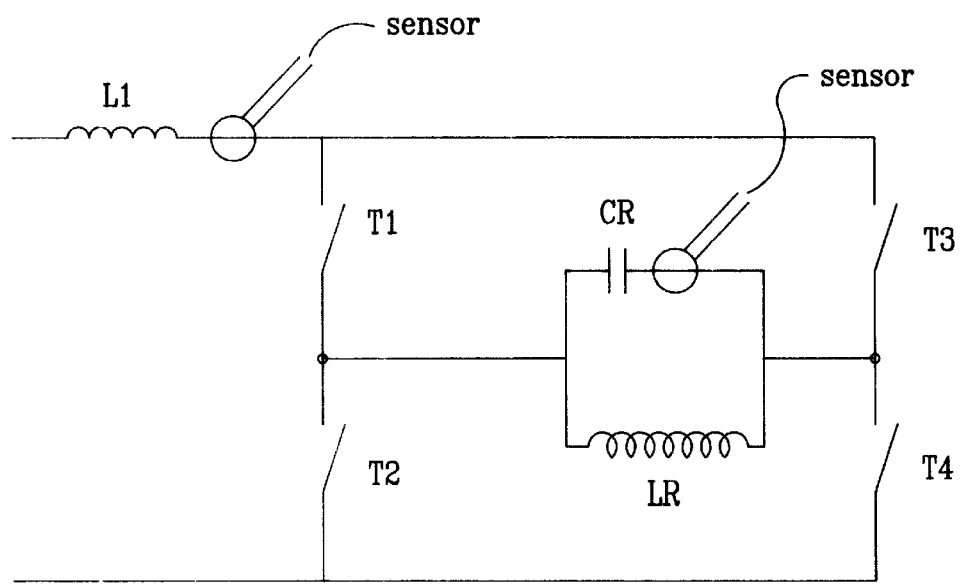

The invention will be described in greater detail in the following with reference to the drawing, in which FIG. 1 shows a block schematic of a circuit for the control of the feed of energy according to the invention, FIG. 2 shows a hybrid resonant circuit built into a full bridge converter with an indication of the currents and voltages here discussed, FIG. 3 shows the general time function of a voltage and a current in a parallel resonant circuit as well as the intervals, during which current to the parallel resonant circuit may be switched on, FIG. 4 shows the time function of the feed of current in the case of small period time for the fed current and control in dependence of the zero crossing of the current, FIG. 5 shows the time function of the feed of current in the case of a large period time for the fed current and control in dependence of a time delay with respect to the zero crossing of the voltage, and FIG. 6 shows the placement of current sensors which are used for generating control and safety signals.

In FIG. 1 is shown an example of a basic diagram for a circuit for the control of the energy supply in resonant converter of the type comprising a hybrid resonant circuit. It will be seen that a rectifier circuit enables the possibility of feeding a direct voltage to the hybrid resonant converter, whereby measurements of both voltage and current are performed. In a three-phase mains supply the use of the well known "bridge-of-six" rectifier provides a voltage which does not go to zero. A control circuit is shown in a quite general manner, as it is this which using current and/or voltage measurements provides the correct turn-on of the switches (in particular transistors) which perform the correct feeding of the currents into the parallel resonant circuit part of the hybrid resonant circuit. It may be relevant to measure in other points of the practical circuit It has furthermore been shown that there is a possibility to incorporate safety circuits in that the control circuit may also influence the functioning of the rectifier.

In FIG. 2 is shown how the hybrid resonance converter may be built in principle. Numerous circuit details have not been shown, as they are only constituted by those extra components which are needed in order that four switches T1, T2, T3, T4 (in particular transistors) may be turned on and off according to the invention. The practical detained construction of such circuits falls within the capabilities of the person skilled in the art. The hybrid resonant converter is made up of a hybrid resonant circuit which consists of a paralell resonant circuit CR, LR which is in series with a self inductance L1 which defines a series resonant circuit together with CR. In case L1 is small the series resonant frequency is high and determined by L1 and CR (because LR at such a high frequency represents a high impedance) but when L1 is larger there will be an interplay between all three components, where the series resonant frequency is in reality determined by the phase relationships in the oscillation.

The energy is fed into the parallel resonant circuit by current being fed each half period with opposite direction. This is obtained by either T1, T4 being closed (on), or T2, T3. It is advantageous to feed the energy in a zero crossing of the resonance current, because the voltage across the parallel resonant circuit (i.e. across its capacitor CR) will then be high Under these conditions the series resonant circuit which is established between L1 and CR has the time to feed sufficient energy to raise the voltage across CR above the level of the DC voltage, whereby the current through the switches which have conducted until now T1, T4 or T2, T3 falls to zero. In case the starting voltage across CR is not sufficient or if L1 is too large, the voltage across the capacitor cannot increase sufficiently, and the current through the switches does not reach zero before switching-off is attempted, and thereby an undesired switch loss is created. It is such a situation which use of the invention prevents. The method described for feeding energy into the parallel resonant circuit may in this case be said to be current controlled. The current control is characterised by the switches being turned on immediately following the zero crossing of the current. An alternative method is to generate the turn-on signal for the switches from the zero crossing of the voltage across the parallel resoant circuit, as this is ideally 90° after the parallel resonance current, but in practice somewhat different because of the brief charging time. In this case there is sufficient time to turn on, and the circuits need not be so fast as in the case of current control. With a view to this method of control which may be termed voltage control there must be built into the control circuit a delay which corresponds to the correct phase shift. The advantage of this method of control and when turning-on before the zero crossing of the current in the parallel resonant circuit is that the amplitude of the charging current becomes less. In this way, the losses in the switches T1–T4 are reduced, the efficiency of the circuit is increased, and switches which are graded to a smaller power may be used. Furthermore the system becomes less critical with respect to time delays caused by possible component tolerances, because the time delay is controlled by the control circuit. The limitation in this system is that the nearer the value of L1 gets to LR, the more there is no longer a pure series resonance, and by early turn-on the ramp current, i.e. an increasing DC value which is in principle always present and which may make breaking at the current zero crossing difficult, will be more prominent in function of the value of L1. The nearer one gets to turning-on 90° before, the more dominating this phenomenon becomes.

In FIG. 3 are seen the permissible intervals for turning-on using current and voltage control respectively. It is shown in conjunction with curves which represent the voltage across the parallel resonant circuit UR and the current in the parallel resonant circuit IR in an imagined case where virtually no energy is taken from the circuit. The rule that the current precedes the voltage by 90° applies.

In FIG. 4 is shown an example of the use of current control for feeding energy into the parallel resonant circuit, and it shows the general function of the voltage across the parallel resonant circuit UR and the current to the parallel resonant circuit IL1. Furthermore a high series resonant frequency has been chosen which gives short current pulses which appear at turn-on ca. 100° after a zero crossing of UR and a turn-off when the current through the switches has fallen to zero. By the signatures T14 and T23 respectively reference is made to the switches in the full bridge configuration of FIG. 2 where T1, T4 and T2, T3 respectively are on.

In FIG. 5 is correspondingly shown an example of the use of voltage control, and the general function of the voltage across the parallel resonant circuit UR and the current to the parallel resonant circuit IL1 are again shown, this time a low series resonant frequency being chosen which gives long current pulses. These appear by turn-on 90° preceding a zero crossing of UR and turn-off when the current through the switches has fallen to zero. In the adjustment of the resonant frequencies shown this means that the second pair of switches T2, T3 switch on immediately after the first pair T1, T4 has switched off. In this control configuration it may happen that it is required to switch off, even though the current through L1 does not have the value zero This may be an advantage in a combined loss assessment because the least total losses may often be obtained by a suitable combination of conductor losses in coils and switches and particular switch losses.

In general it may be said that a wide current pulse with a small amplitude gives rise to less ohmic losses in L1 and in the switches, while a high amplitude provides for less coupling between two or more hybrid resonant converters which are connected to the same DC voltage source. Dependent on the precise configuration, the optimal turn-on instant lies between these two extremes and may be determined by the person skilled in the art by a few experiments based on the power requirement and the acceptable variation in cooking vessel characteristics.

By means of the invention it is possible to increase appreciably the safety surrounding the use of resonant converters in connection with heating units for foodstuffs. This is so, because the drive principle gives a possibility to detect currents and voltages which are changed strongly due to unwanted situations. Such will in practice be non-presence of cooking vessel, wrong cooking vessel bottom material, excentric placement of cooking vessel, and short-circuit.

Due to the radiation of magnetic field a complete disconnection of the heating unit must occur in case there is no cooking vessel on the hotplate or if a cooking vessel is eccentrically placed. Such a condition may be monitored as a change in the current which is fed to the hybrid resonant converter, i.e. the current through L1. If there is no cooking vessel on the heating unit the value of the current which is fed falls considerably, because no appreciable energy is drawn from the parallel resonant circuit. This is easily detectable because it is simple to detect the current as shown in FIG. 6, e.g. by means of a current transformer. Such a detected current may be averaged by means of rectification and an integrating capacitor, where a sensible choice of time constant may provide a DC value as an indicator of the load condition.

Other parameters of the time function of the current through L1 may be used for detection of a missing or excentrically placed cooking vessel, using that the changed coupling to LR is displayed by the apparent reduction of LR, whereby the relationship between L1 and LR is changed in such a way that the controlled switching-off of the current happens, even though the current has neither fallen to the minimum which was expected or to zero. One may hence let the control perform the shutting down of the heating unit in case it is ascertained that switching-off occurs at a current which exceeds a pre-determined value.

Cooking vessels in materials such as copper or aluminium are not immediately useful for induction heating units, unless extra inductances and/or capacitances are connected to the circuit in order to adjust the frequency. A simpler solution for a safety circuit in connection with the invention is to disconnect the power supply As shown in FIG. 6 it is possible, e.g. by means of a current transformer to measure the resonant current of the parallel resonant circuit, the amplitude and frequency of which are changed materially by the wrong bottom material for the cooking vessel.

A short circuit protection may obviously be obtained by means of fuses in the mains connection, but these usually react so slowly that the semiconductors may have been destroyed already. A monitoring of the amplitude of the current through L1, detected as in the "missing cooking vessel" case and shown in FIG. 6 will indicate a possible short circuit in the switch bridge T1–T4.

It is expedient to detect the load situation frequently during operation and in any instance before full power is applied. This is suitably effected by performing a test phase where the system is energized in a period of time which corresponds to maximum one half period of the mains voltage and minimum one turning-on of a switch pair (T1, T4 and T2, T3, respectively), after which the decay is monitored. In case a mismatched load is detected, the power supply is disabled as compared to the normal condition. Such a test phase may advantageously be performed not only at the initiation but also at regular intervals with a view to detecting whether a cooking vessel has been removed during heating.

I claim:

1. A circuit for the control of the energy supply in a resonance converter comprising a rectifier for the mains voltage, an inverter, a resonant circuit which delivers energy by inductive coupling to a cooking vessel for food, and current feed means for feeding current from the rectifier to the inverter, said current having a period of oscillation which is less than or equal to half the period of oscillation of the resonant circuit.

2. A circuit according to claim 1, wherein a hybrid resonant circuit is provided which is comprised of the resonant circuit and a series self-inductance, the value of which defines a series resonant circuit having said period of oscillation, the output of the hybrid resonant circuit being connected to said inverter as a means for setting the time function of the current fed to the inverter.

3. A circuit according to claim 2, wherein said current feed means includes means for controlling the current to have a starting instant which is up to 90° before the zero crossing of the voltage of the hybrid resonant circuit.

4. A circuit according to claim 3, comprising switch means for switching off the current when it passes a value which is as close to zero as possible.

5. A circuit according to claim 2, comprising switch means for switching off the current when it passes a value which is as close to zero as possible.

6. A circuit according to claim 2, wherein said current feed means includes means for controlling the current fed with a starting instant which is up to maximum 105° after the zero crossing of the voltage of the hybrid resonant circuit.

7. A circuit according to claim 2, further comprising measuring means for measuring the current which is fed to the hybrid resonant circuit in order to detect the delivery of energy.

8. A circuit according to claim 7, characterised in that the mean value of the current is measured by said measuring means.

9. A circuit according to claim 2, further comprising means for measuring the current through or the voltage across a resistance of the resonant circuit as the input signal for the evaluation of the presence of an unsuitable material for the cooking vessel bottom.

10. A circuit according to claim 1, further comprising means for measuring the current through or the voltage across a resistance of the resonant circuit as the input signal for the evaluation of the presence of an unsuitable material for the cooking vessel bottom.

11. A circuit according to claim to claim 1, further comprising measuring means for measuring currents and voltages in a test phase during supply of energy in a time interval which lies in the interval between the duration of a half-period of the resonance frequency of the resonant circuit and the duration of a half-period of the mains voltage.

12. A circuit according to claim 1, further comprising means for controlling feeding the current to have a starting instant which is up to 90° before the zero crossing of the voltage of the hybrid resonant circuit.

13. A circuit according to claim 1, comprising switch means for switching off the current when it passes a value which is as close to zero as possible.

14. A circuit according to claim 1, further comprising means for controlling the current fed with a starting instant which is up to maximum 105° after the zero crossing of the voltage of the hybrid resonant circuit.

15. A circuit according to claim 1, further comprising measuring means for measuring the current which is fed to the hybrid resonant circuit in order to detect the delivery of energy.

* * * * *